United States Patent
Nakashita

(10) Patent No.: US 9,442,843 B2
(45) Date of Patent: Sep. 13, 2016

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Tsunahito Nakashita, Mitaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/083,543

(22) Filed: Nov. 19, 2013

(65) Prior Publication Data
US 2014/0149645 A1    May 29, 2014

(30) Foreign Application Priority Data
Nov. 29, 2012  (JP) .................. 2012-261630

(51) Int. Cl.
G06F 12/02  (2006.01)
G06F 12/12  (2016.01)
G06F 11/30  (2006.01)

(52) U.S. Cl.
CPC ....... *G06F 12/0246* (2013.01); *G06F 11/3034* (2013.01); *G06F 2212/7211* (2013.01)

(58) Field of Classification Search
None
See application file for complete search history.

(56) References Cited

U.S. PATENT DOCUMENTS

| 8,879,319 | B1* | 11/2014 | Cassuto et al. | 365/185.03 |
| 2004/0139282 | A1* | 7/2004 | Yoshioka et al. | 711/133 |
| 2008/0256287 | A1* | 10/2008 | Lee et al. | 711/103 |
| 2010/0205354 | A1* | 8/2010 | Suzuki | 711/103 |
| 2011/0167208 | A1* | 7/2011 | So et al. | 711/103 |

FOREIGN PATENT DOCUMENTS

| JP | 2004234473 A | 8/2004 |
| JP | 2009093242 A | 4/2009 |

\* cited by examiner

*Primary Examiner* — Idriss N Alrobaye
*Assistant Examiner* — Dayton Lewis-Taylor
(74) *Attorney, Agent, or Firm* — Rossi, Kimms & McDowell LLP

(57) ABSTRACT

An information processing apparatus capable of reading/writing a storage device capable of performing dynamic wear leveling, a method of controlling the apparatus, and a storage medium. The apparatus confirms a logically free region of the storage device, and performs writing of dummy data to the logically free region and logical deletion of a region to which the dummy data is written.

10 Claims, 17 Drawing Sheets

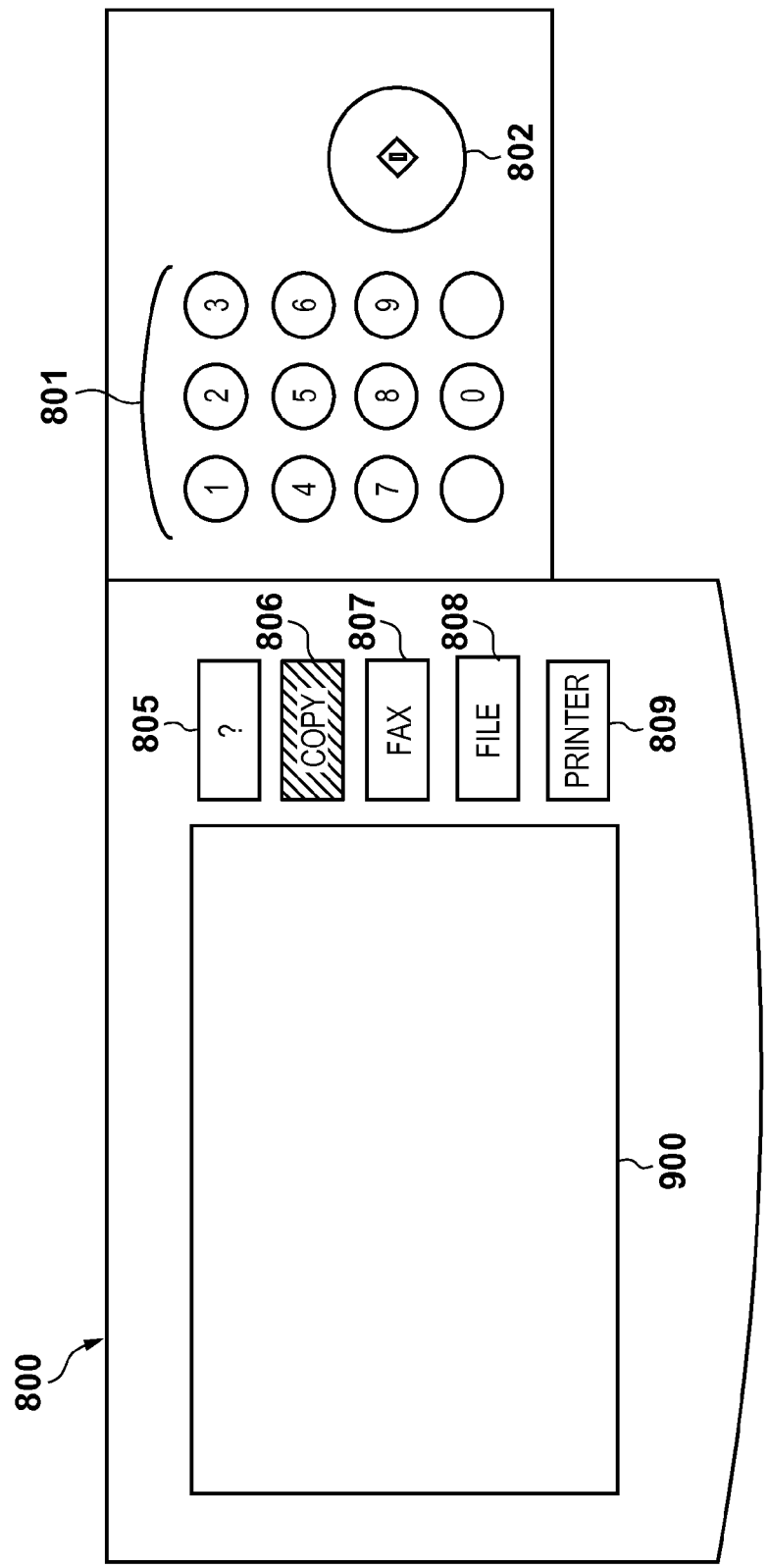

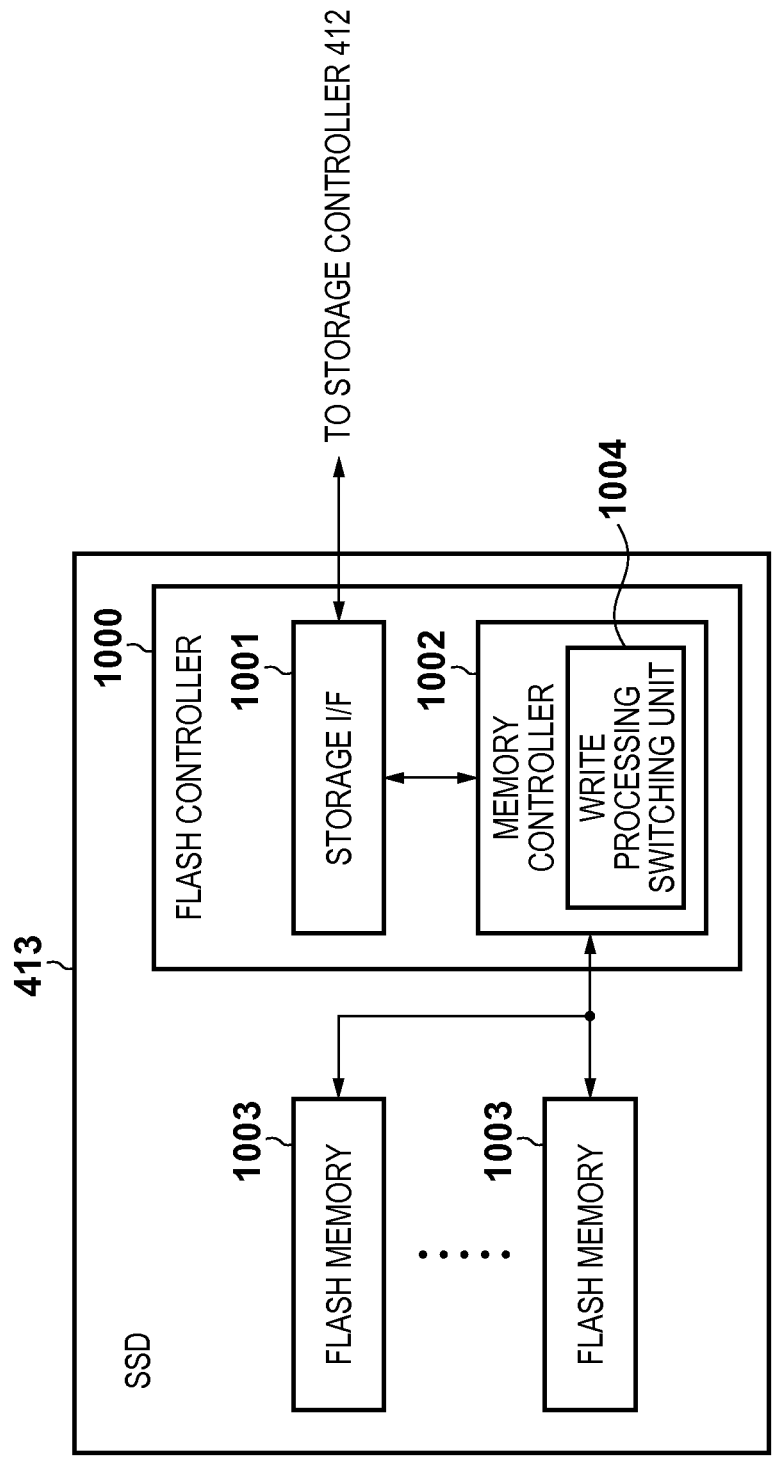

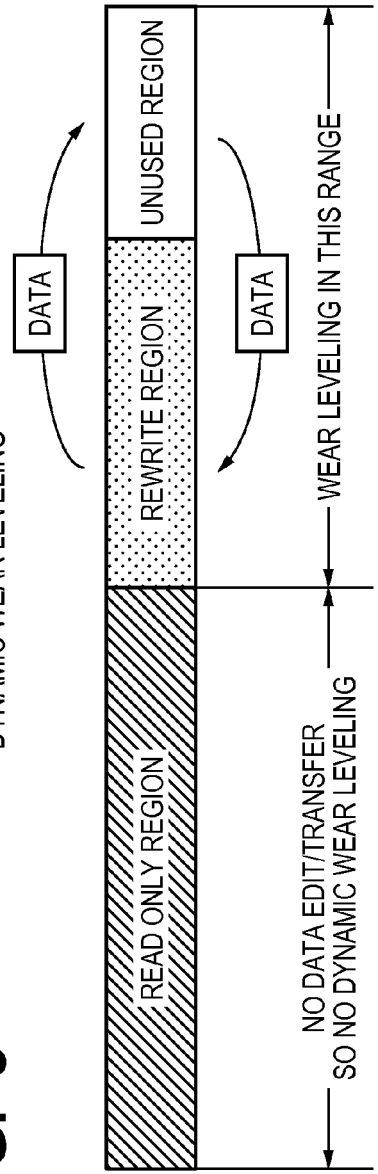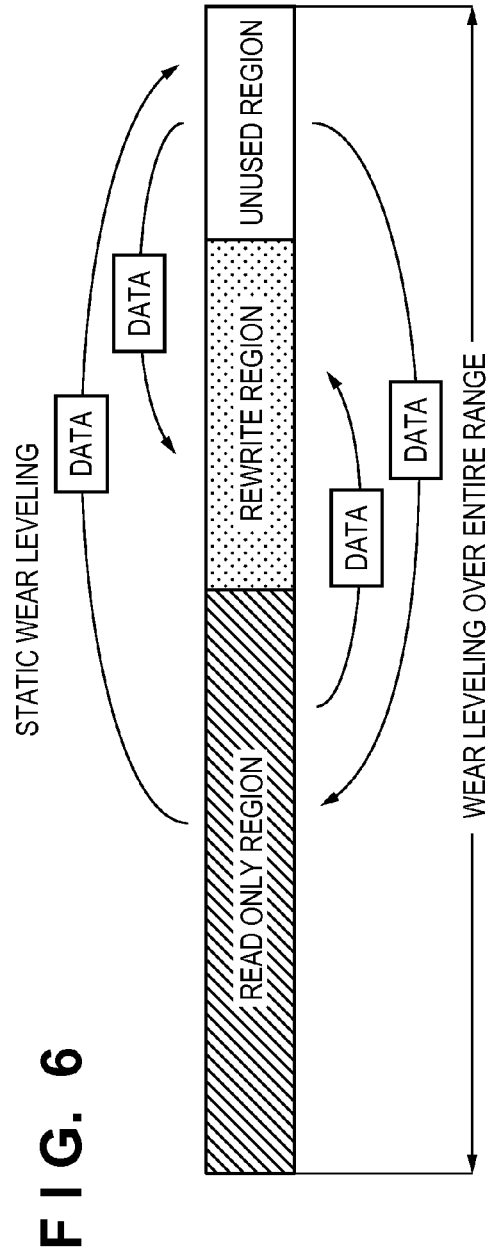

F I G. 17
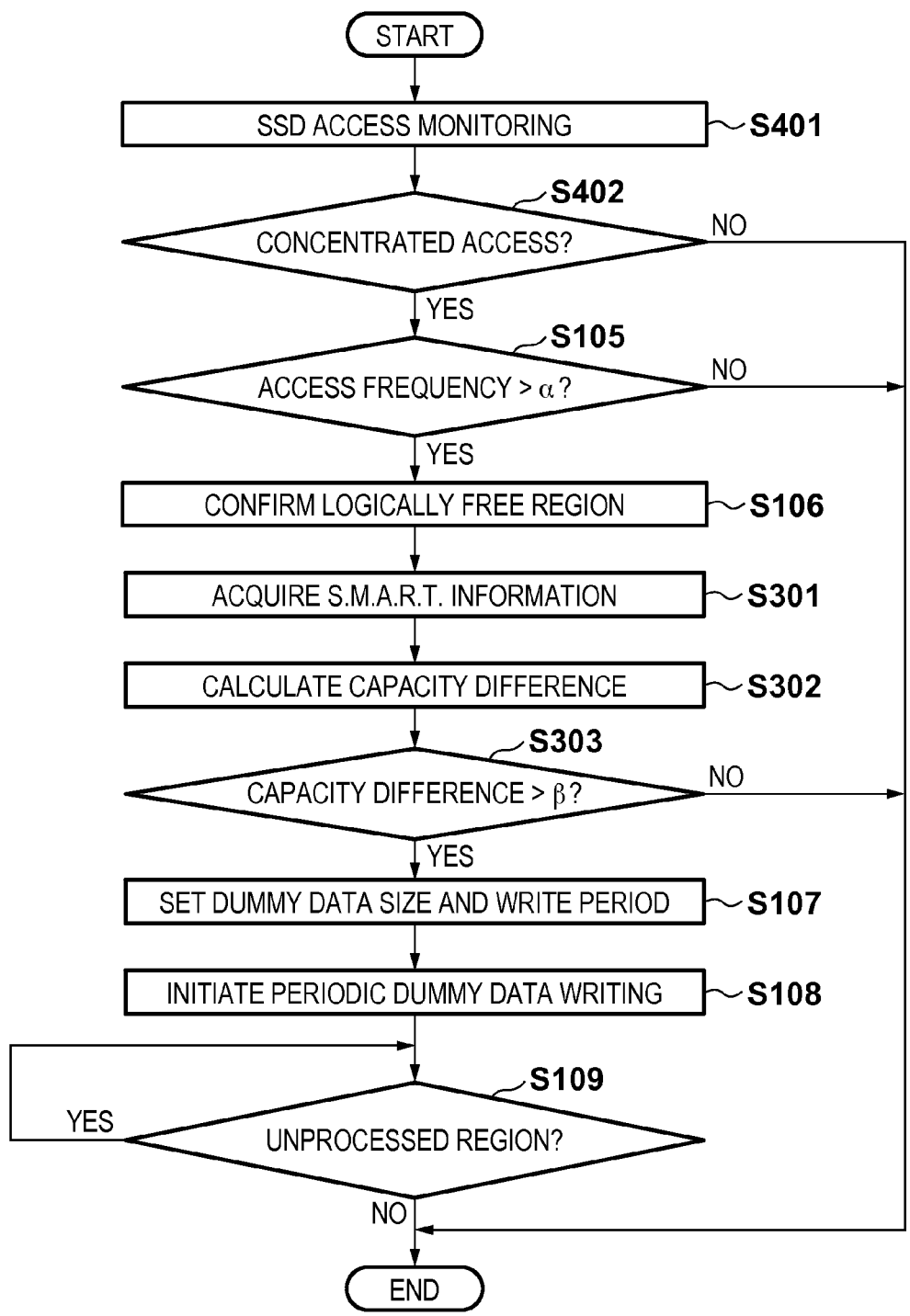

INFORMATION PROCESSING APPARATUS, METHOD OF CONTROLLING THE SAME, AND STORAGE MEDIUM

BACKGROUND OF THE INVENTION

1. Field of the Invention

The present invention relates to an information processing apparatus for performing reading from and writing to a storage apparatus, to a method of controlling the same and to a storage medium.

2. Description of the Related Art

Conventionally, there have been image forming apparatuses wherein an HDD (hard disk drive) is installed in the image forming apparatus, and as well as storing programs that the image forming apparatus executes in the HDD, a storage function for performing such things as saving image data in the HDD, and editing the saved images, is realized.

In recent years, increases in capacity and decreases in cost have progressed, and SSDs (Solid State Drives), which have rapidly spread along with the popularity of such things as mobile PCs, have come to be capable of performing faster random access than HDDs. Furthermore, SSDs are characterized as having low electric power consumption and high shock resistance, and being light weight and space economical. In particular, because on system start-up, initialization operation, such as a spinup operation necessary in the case of HDDs, is not necessary, shortening of system start-up time, together with high speed data transfer, has been highly anticipated.

However, NAND flash memory, which is a storage device, that is equipped in SSDs, has upper limits on the number of possible writes (for SLC, roughly 100,000 times, for MLC roughly 10,000 times). Furthermore, due to process miniaturization, there will be a tendency in flash memory for the number of possible rewrites to decrease from current levels in the future. This problem is mitigated by wear leveling techniques in which a flash memory controller installed in the SSD performs write destination averaging so that the frequency of writing is not concentrated on a particular region in order to increase the life span of the storage device. There are two main types of wear leveling: dynamic wear leveling and static wear leveling.

FIG. 5 is a view for explaining dynamic wear leveling.

Dynamic wear leveling is characterized as performing wear leveling in a range of physical memory allocated for a write addresses. Specifically, static data that is not frequently updated, such as an operating system (hereinafter OS) is saved in a read only region and left, and only dynamic data (new data) is scattered. So, because it is only performed on physical memory for necessary rewrites, it has the advantage that the number of rewrites can be suppressed, but on the other hand, it has the disadvantage that there is a possibility that the valid range for wear leveling will become narrower due to usage circumstances of the physical memory.

FIG. 6 is a view for explaining static wear leveling.

In static wear leveling, even for physical memory allocated to addresses to which writing was not performed, data is relocated and wear leveling is performed for all regions. Here, the number of rewrites is recorded for each block, and data writing is performed to a block having as few rewrites as possible. Also, as necessary, the data of a rewritten block (static data) is relocated to another block to attempt to equalize the numbers of writes. So, in contrast to dynamic wear leveling, static wear leveling has the advantage that there is no limit on the valid range of the wear leveling. However, it has the disadvantage that unnecessary rewrites to the physical memory occur frequently. In general, SSDs employ one of these two types of wear leveling, or use a combination of the two (for example, see Japanese Patent Laid-Open No. 2004-234473 and Japanese Patent Laid-Open No. 2009-093242).

Furthermore, in recent years, maintaining the security of data stored on storage devices installed in image forming apparatuses, and requirements regarding protection of privacy have been highly demanding, and it has been required that spool data and saved data stored in storage be completed deleted (hard deleted). However, while SSDs, unlike HDDs, can hard delete data with one rewrite, because of wear leveling, with standard write processing, data to be deleted cannot be directly rewritten, and so in order to hard delete the data, special write processing must be performed.

In SSDs that employ dynamic wear leveling, when there are a sufficient number of unused blocks in the installed flash memory, leveling functions extremely well, but when there are too few unused blocks, leveling stops functioning effectively. For example, when a disk copy to an SSD is performed with a copy tool such as a duplicator from a master disk, there are cases where a disk image of the master disk is copied to the entire range of the copy destination SSD. In such cases, the SSD to which the copy was performed enters a state in which data is written even to the physical blocks allocated to logically free regions as seen from the file system. In other words, from the perspective of a flash memory controller installed in the SSD, because all of the blocks are in a used state, dynamic wear leveling does not function effectively.

FIG. 7 is a view for showing an example of a 4 GB SSD wherein the SSD is in a state in which dynamic wear leveling has stopped functioning effectively. In FIG. 7, because data is written in a read only region, which is a valid data region, and to a logically free region, wear leveling is executed between a small unused region and rewrite region.

FIG. 8 is a view for showing a relationship between logical addresses and physical blocks of the SSD in the state shown in FIG. 7.

In a case where the SSD is embedded in a system and operated in this state, when an OS, or the like, performs concentrated rewrite processing on a particular region, because the wear leveling does not function effectively, there is a problem in that the life span of the physical blocks allocated to the particular region is exhausted extremely quickly.

In order to solve this kind of a problem, it is necessary to change the physical blocks allocated to the logically free regions from being in the used state to being unused blocks in an unused state. Generation of unused blocks, can be realized by performing rewrite processing of released data, after having written arbitrary data (dummy data) to the logically free region in the file system in a block unit, to the regions to which the dummy data was written. However, because processing speeds for write processing for flash memory are slow, in cases where the logically free region to be rewritten is large, there is a problem in that system performance is degraded due to the write processing.

SUMMARY OF THE INVENTION

An aspect of the present invention is to eliminate the above-mentioned problems with the conventional techniques.

A feature of the present invention is to provide a technique in which performance degradation is prevented by dispersing a load due to rewrite processing of dummy data to all of a logically free region.

According to an aspect of the present invention, there is provided an information processing apparatus capable of performing reading from and writing to a storage device capable of performing dynamic wear leveling. The apparatus comprises a confirmation unit configured to confirm a logically free region of the storage device and a generation unit configured to perform writing of dummy data to the logically free region confirmed by the confirmation unit and logical deletion of a region to which the dummy data is written.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view for explaining a configuration of an operation unit of the image forming apparatus according to the embodiment.

FIG. 4 is a block diagram for showing a configuration of an SSD according to the embodiment.

FIG. 5 is a view for explaining dynamic wear leveling.

FIG. 6 is a view for explaining static wear leveling.

FIG. 17 is a flowchart for describing processing that adds determination processing for determining enactment of dummy data rewrite processing based on S.M.A.R.T. information, similarly to FIG. 13, in an idle state in an environment where the image forming apparatus has no HDD.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention. Note, in the present embodiment, explanation is given having the information processing apparatus of the present invention be a multi function peripheral (MFP) that is an image forming apparatus, but the present invention is not limited to configuration as a multi function peripheral.

Figure 1:
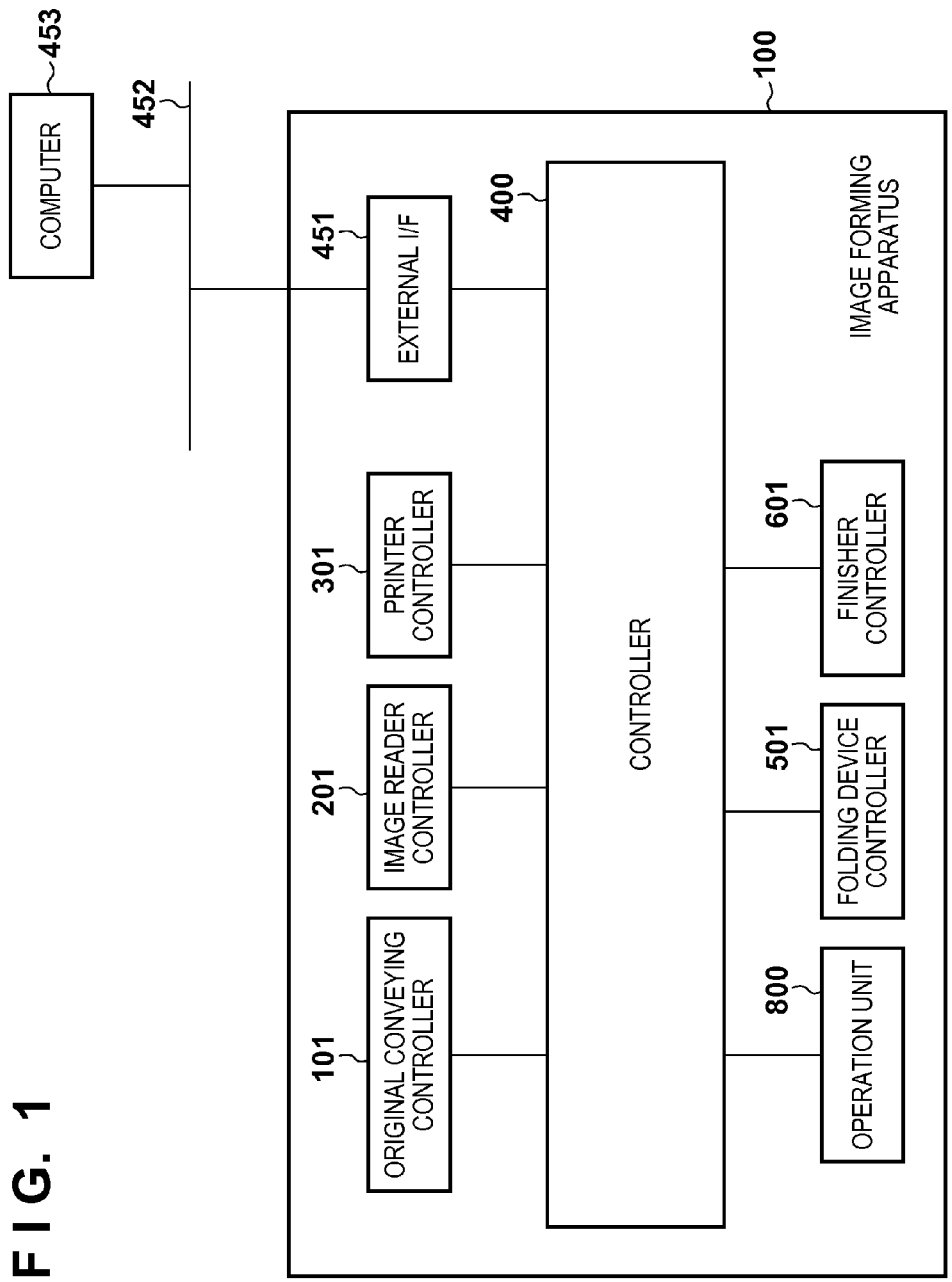
FIG. 1 is a block diagram for showing an overall configuration of an image forming apparatus according to an embodiment of the present invention.

FIG. 1 is a block diagram for showing an overall configuration of an image forming apparatus 100 according to the embodiment of the present invention.

The image forming apparatus 100 is controlled by a controller 400. The controller 400 communicates with an original conveying controller 101 that controls an original conveying apparatus based on instructions from an operation unit 800 (FIG. 3) and a computer 453 and with an image reader controller 201 that controls an image reader, and acquires image data of an input original. Also, the controller 400 communicates with a printer controller 301, that controls a printer unit, to print image data onto a sheet. Also, the controller 400 performs communication with a folding device controller 501 that controls a folding device, and with a finisher controller 601 that controls a finisher, and executes desired post-processing such as stapling and punching on the printed sheet.

An external I/F 451 is an interface for connecting to the computer 453. The external I/F 451 receives print data from the computer 453 via an external bus 452 such as a USB or a network, for example, and extracts and outputs an image. Also, image data stored in a semiconductor storage 413 (hereinafter referred to as an SSD) or a hard disk drive 407 (hereinafter referred to as an HDD) (later described with reference to FIG. 2) is read out, and transmitted to the computer 453.

Figure 2:
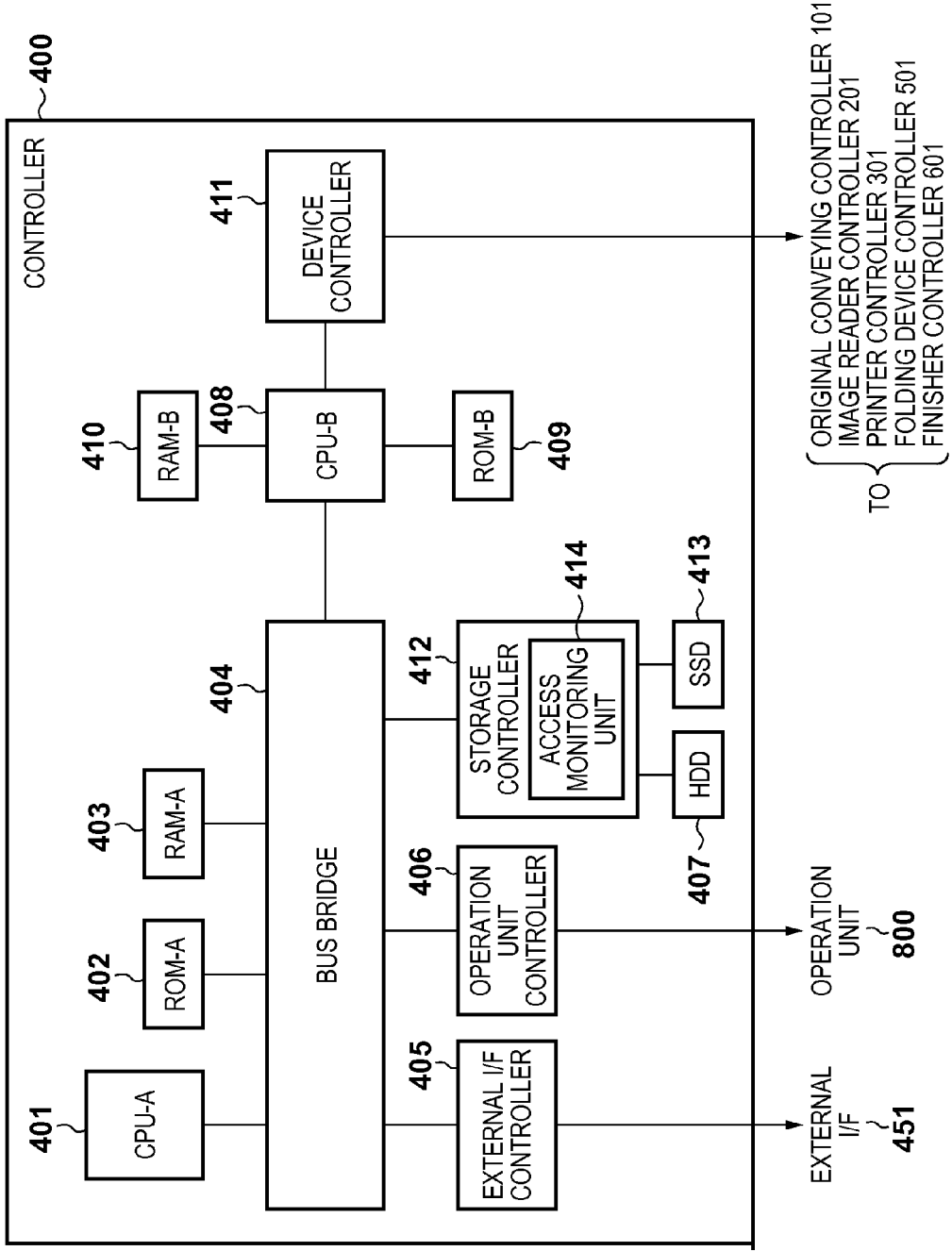
FIG. 2 is a block diagram for showing a configuration of a controller according to the embodiment of the present invention.

FIG. 2 is a block diagram for showing a configuration of the controller 400 according to the embodiment of the present invention.

The controller 400 has two CPUs (CPU-A 401 and CPU-B 408), and each is controlled by an operating system (hereinafter referred to as OS). A bus bridge 404 is connected to CPU-A 401 and via the bus bridge 404, CPU-A 401 and CPU-B 408 can communicate. Also, the bus bridge 404 is connected to a ROM-A 402 that stores an initial start-up program of the CPU-A 401, and in a RAM-A 403, control data of the CPU-A 401 is stored temporarily. Also, the bus bridge 404 is connected to the RAM-A 403, which is used as a work area for calculation accompanying control, and the bus bridge 404 is also connected to a storage controller 412 which controls storage devices such as an SSD 413 and an HDD 407.

The SSD 413 stores a main program including an OS of the CPU-A 401 and of the CPU-B 408. Also, in a case where the HDD 407, which is set to be optional, is not connected, the SSD 413 becomes a storage destination for image data acquired from the image reader or the external I/F 451 or for image data when an image is edited by the operation unit 800. Also, the SSD 413 is used as a storage destination for all data such as application programs, user preference data and the like. In the present embodiment, the SSD 413 is assumed to be a flash disk. An access monitoring unit 414 monitors to determine whether or not there are concentrated accesses on a particular logical address region of the SSD 413.

Also, in cases where the optional HDD 407 is connected, the HDD 407 is used as the storage destination for image data acquired by the image reader or the external I/F 451, edited image data and application programs in place of the SSD 413. Also, the HDD 407 is used as a storage destination for application programs and user preference data. Configuration is taken so that the HDD 407 can be accessed from CPU-A 401 and from CPU-B 408. Also, an external I/F controller 405 that controls the network or a USB interface, and an operation unit controller 406 that controls the operation unit 800 are connected to the bus bridge 404.

A ROM-B 409 that stores an initial start-up program of the CPU-B 408, and a RAM-B 410 that temporarily maintains control data of the CPU-B 408, and is used as a work area for calculation accompanying control, are connected to the CPU-B 408. Furthermore, the CPU-B 408 is connected to a device controller 411. The device controller 411 is connected to the original conveying controller 101, the image reader controller 201, the printer controller 301, the folding device controller 501 and the finisher controller 601 shown in FIG. 1 and controls each of these.

FIG. 3 is a view for explaining a configuration of the operation unit 800 of the image forming apparatus 100 according to the embodiment.

A display unit 900 has attached to its screen a touch panel sheet, and along with displaying operation screens, transmits position information to the operation unit controller 406 when a user presses a displayed key. A numeric keypad 801 is used when the user enters a numeral such as a number of copies. A start key 802 is used for indicating initiation of a copy operation or an original read operation after the user set desired conditions, for example. Also, when the user, not knowing the functionality of a key, presses a guide key 805, explanation is displayed. A copy mode key 806 is pressed by the user to instruct a copy. A fax key 807 is pressed by the user to perform setting related to fax. A file key 808 is pressed by the user to output file data. A printer key 809 is used by the user when performing such operations as setting related to print output from an external apparatus such as the computer 453.

Next, detailed explanation will be given for an automatic switch control method for switching data write processing in a data hard delete mode in the SSD 413 of the image forming apparatus 100, according to the present embodiment.

FIG. 4 is a block diagram for showing a configuration of the SSD 413 according to the embodiment.

A flash controller 1000 has a storage I/F 1001 and a memory controller 1002. The storage I/F 1001 is a module for communicating with the storage controller 412 of the controller 400. In the present embodiment, a serial ATA (hereinafter referred to as SATA) interface is assumed.

The memory controller 1002 performs leveling of rewrite frequency to a flash memory 1003 using dynamic wear leveling. The memory controller 1002, includes a write processing switching unit 1004 that, based on commands received from the storage I/F 1001, performs reading/writing of data to the flash memory 1003. The write processing switching unit 1004 switches and executes a first write operation for writing data to an accessed address, and a second write operation for writing data after deleting data that became unnecessary upon a data write. Here, the second write operation is used for writing dummy data to a logically free region.

Next, explanation will be given of characteristics of the present embodiment with reference to FIG. 9 and FIG. 10.

Figure 7:
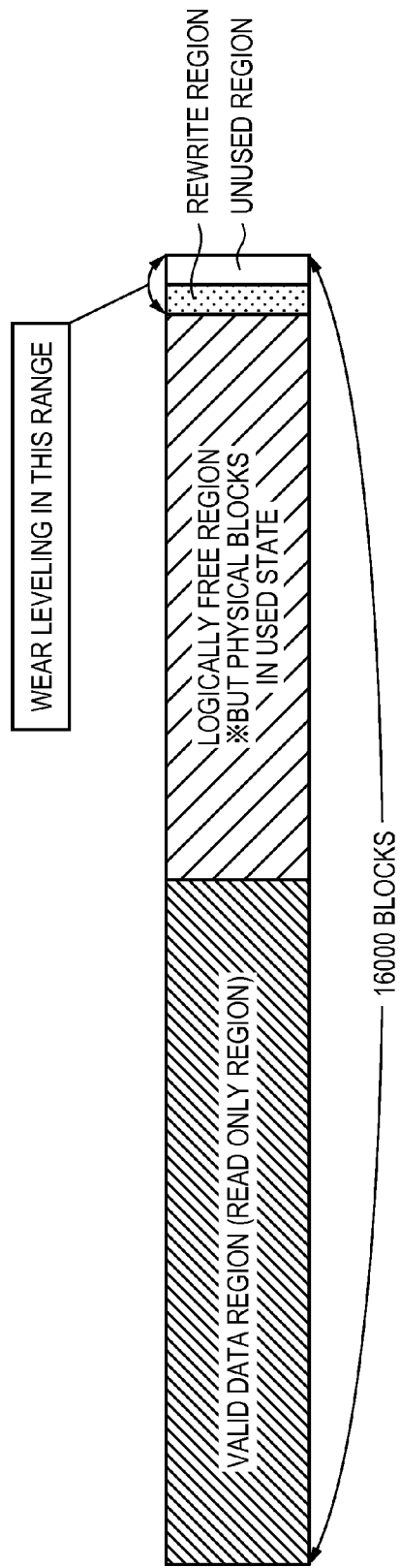
FIG. 7 is a view for showing an example of a 4 GB SSD wherein the SSD is in a state in which dynamic wear leveling has stopped functioning effectively.
Figure 8:
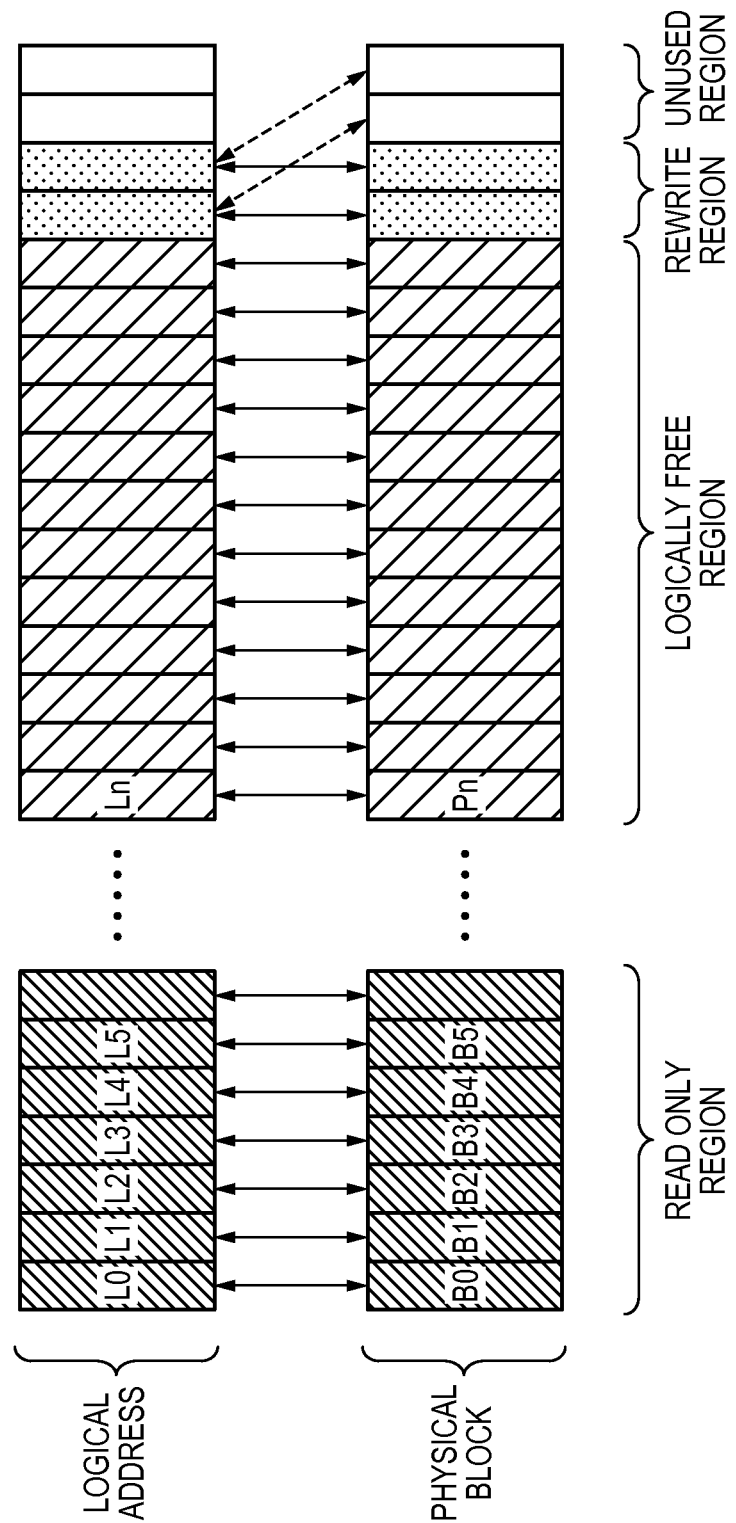
FIG. 8 is a view for showing a relationship between logical addresses and physical blocks of the SSD in the state shown in FIG. 7.
Figure 9:
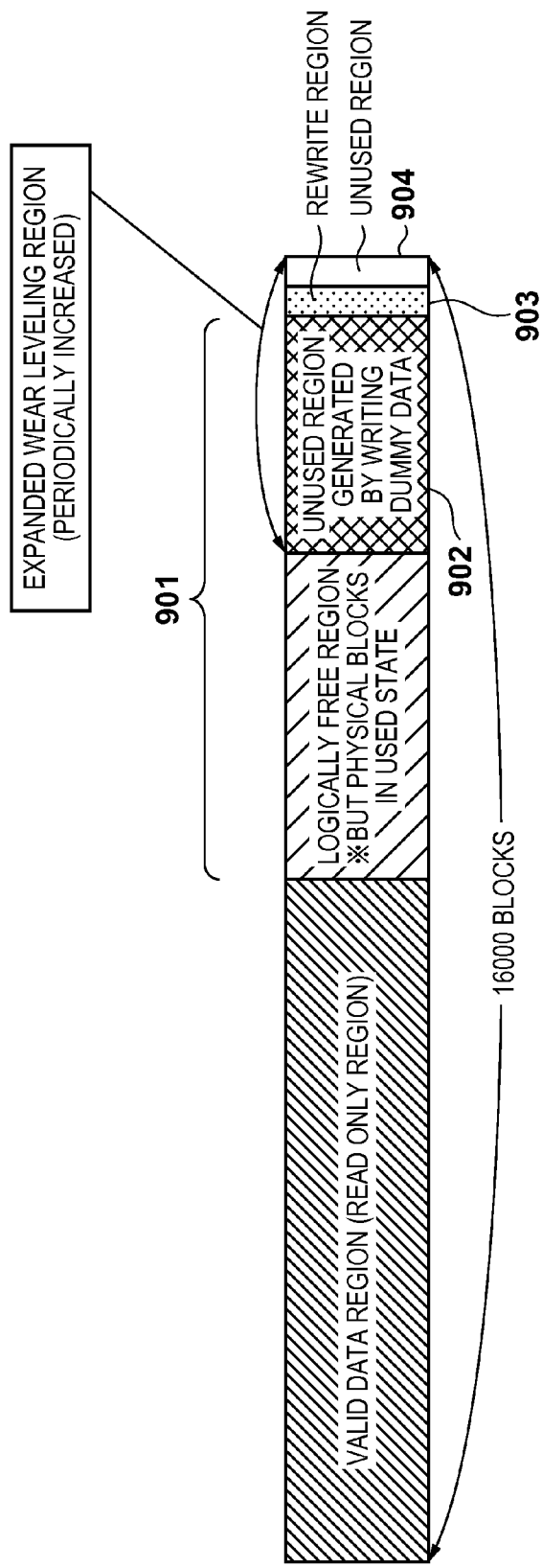
FIG. 9 is a view for showing a state of the SSD that was improved having been in the state shown in previously described FIG. 7 according to the embodiment.

FIG. 9 is a view for showing a state of the SSD that was improved having been in the state shown in previously described FIG. 7 according to the embodiment.

Figure 10:
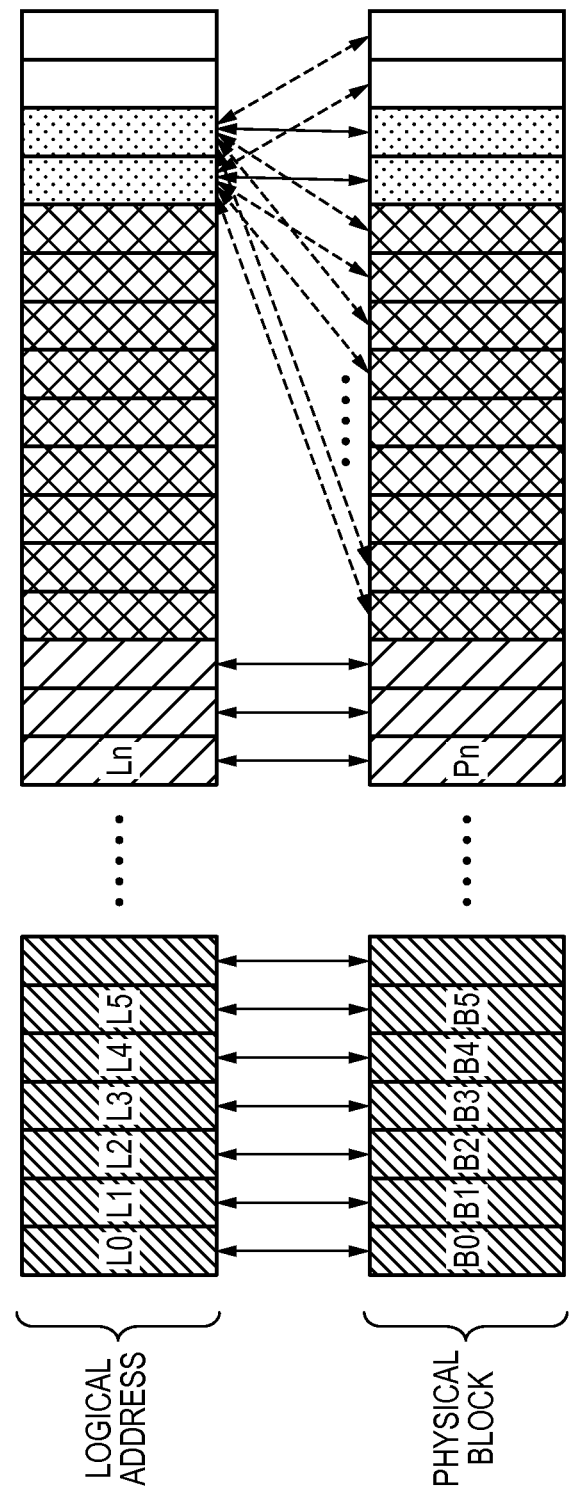
FIG. 10 is a view for showing a relationship between logical addresses and physical blocks of the SSD in the state shown in FIG. 9.

Also, FIG. 10 is a view for showing a relationship between logical addresses and physical blocks of the SSD in the state shown in FIG. 9.

In FIG. 9, an unused region 902 is generated by writing dummy data to a logically free region 901 allocated to physical blocks of flash memory that are in the used state. With this, by using the unused region 902, a rewrite region 903 and an unused region 904, the leveling function can be recovered.

Also, by periodically performing dummy data write processing on the whole area of the logically free region 901 for an appropriate size, load due to this processing is dispersed, and system performance degradation can be suppressed.

Also, by using data "FF" as the dummy data, expenditure of device life span can be substantially suppressed when bit data of the blocks to be written in the flash memory installed in the SSD 413 does not include 0 (zero).

Also, a data size of the dummy data that is written periodically is set to be an integer factor of a block size of the flash memory installed in the SSD 413.

Also, from S.M.A.R.T. information of the SSD 413, the number of the unused blocks of the SSD 413 is read out, and compared against the total capacity of the logically free region. In a case where the difference of the two is less than a predetermined value, writing of the dummy data to the logically free region 901 and logical deletion processing on the written dummy data are not performed.

Below detailed explanation is provided.

Figure 11:
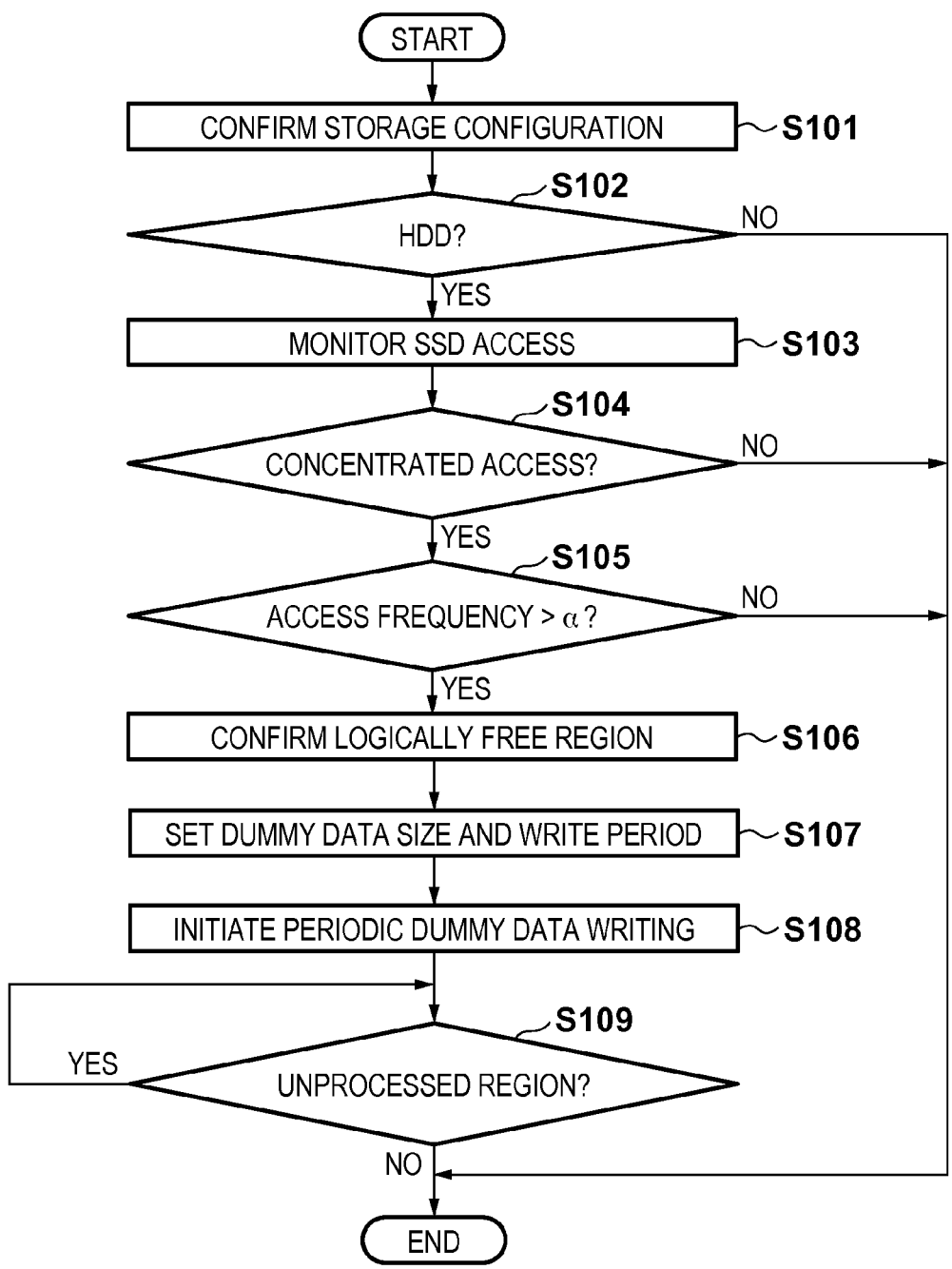
FIG. 11 is a flowchart for describing cancellation processing on a used block allocated to a logically free region by periodic dummy data write processing to a logically free region of the SSD by a controller of the image forming apparatus according to the embodiment.

FIG. 11 is a flowchart for describing cancellation processing on a used block allocated to a logically free region by periodic dummy data write processing to a logically free region of the SSD 413 by the controller 400 of the image forming apparatus 100 according to the embodiment. A program for executing this processing may be loaded into the RAM-A 403 upon execution and executed under the control of the CPU-A 401.

When the CPU-A 401 receives a storage information confirmation request from the OS, the CPU-A 401 firstly, in step S101, confirms a storage configuration of the image forming apparatus 100. Next, in step S102, the CPU-A 401 determines whether or not the HDD 407, which is optional, is connected based on the storage configuration confirmed in step S101, and proceeds to step S103 when the HDD 407 is connected. In step S103, the CPU-A 401 monitors with the access monitoring unit 414 to determine whether or not concentrated access is performed on a particular logical address region of the SSD 413. Here, the access monitoring unit 414 monitors conditions of access to the SSD 413, and determines whether or not there is concentrated access to a particular address of the SSD 413, and the frequency of the access as well as the data size is stored in the RAM-A 403 or the HDD 407.

Next, the processing proceeds to step S104, and when the CPU-A 401 determines that there is concentrated access to a particular logical address region of the SSD 413, the processing proceeds to step S105, and the CPU-A 401 determines the frequency of the access. In a case where in step S105 it is determined that the frequency of the access is greater than a predetermined value α, the processing proceeds to step S106 and the CPU-A 401 confirms the logically free region of the SSD 413. Next, the processing proceeds to step S107, and the CPU-A 401, based on the concentrated access frequency and the access data size acquired from the access monitoring unit 414, determines the write period and the data size at which to write the dummy data to the logically free region of the SSD 413. Here, the period at which to write the dummy data may be set in a range so as not to affect the performance of the image forming apparatus 100. Also, in a case where there is a periodicity to the concentrated access to the particular logical address region, the period at which to write the dummy data may be synchronized with this period. Also, the data size of the dummy data may be set on a condition of an integer factor of the block size of the flash memory installed in the SSD 413, and the CPU-A 401 may generate "FF" (base 16) dummy data for the size that is set.

Next, the processing proceeds to step S108, the CPU-A 401 initiates, under the conditions set in step S107, periodic writing of the dummy data to the SSD 413 and the logical deletion processing on the written dummy data. Next, the processing proceeds to step S109, and the CPU-A 401, in order to cover all of the logically free region of the SSD 413 confirmed in step S106, performs the writing of the dummy data and the logical deletion processing of the written dummy data periodically. Next, when it is confirmed that there is no unprocessed logically free region, the dummy data rewrite processing ends.

Note, when, in step S102, the HDD 407 is not connected, when, in step S104, there is no concentrated access on a particular logical address region of the SSD 413, and when, in step S105, the frequency of the access is less than the predetermined value α, processing is ended without continuing further.

By this processing, in a case where the frequency of access to a logical address region is higher than a predetermined amount, it is possible to write dummy data to the logically free region, and to generate free blocks in the logically free region. Also, by determining a period for writing the dummy data to the logically free region of the SSD 413 and a data size based on the frequency of the concentrated access, and based on the data size of the access, it is possible to generate free blocks more effectively.

Figure 12:
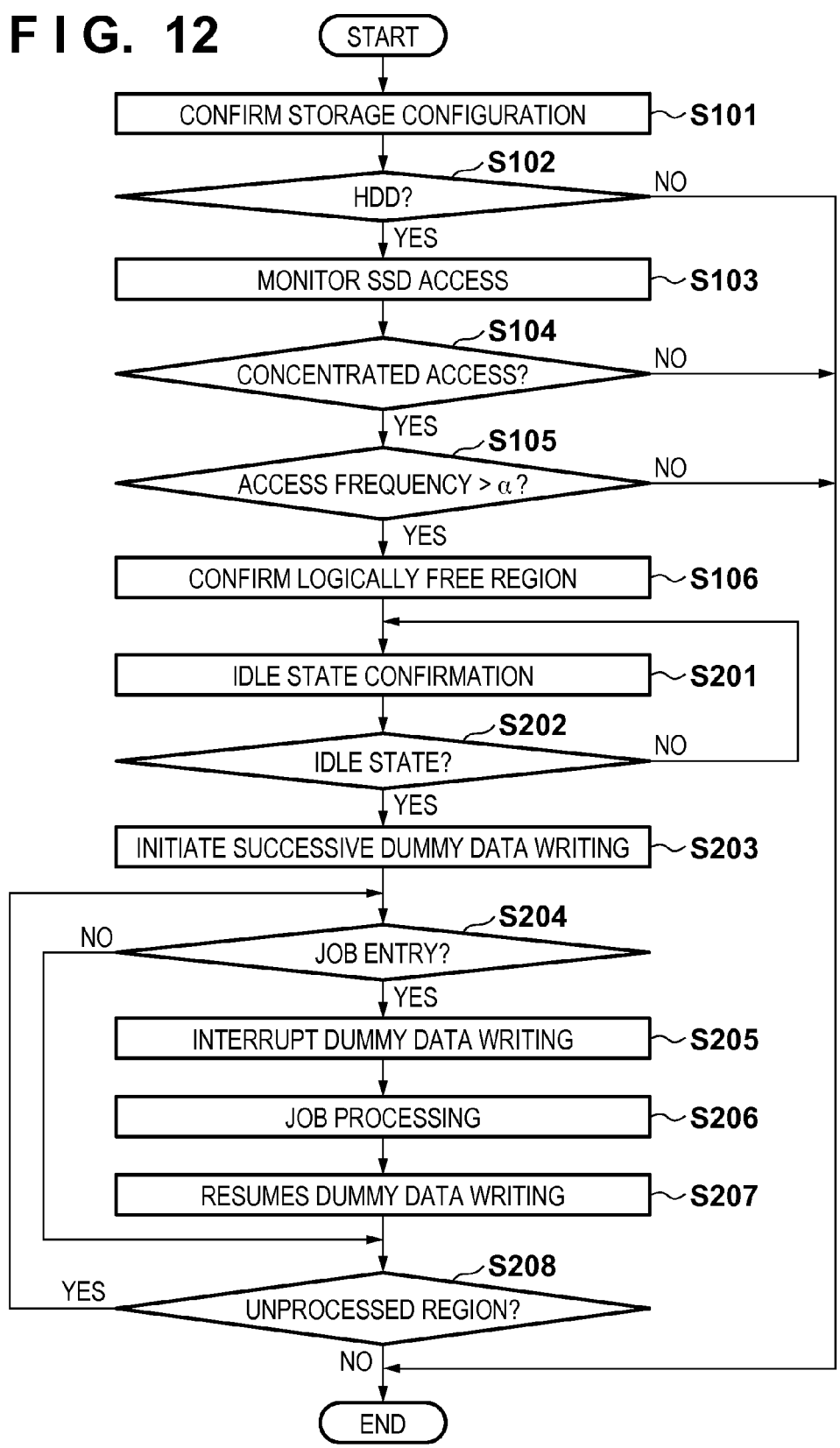
FIG. 12 is a flowchart for describing batch cancellation processing on a used block allocated to a logically free region by rewrite processing of dummy data to a logically free region of the SSD, wherein the image forming apparatus is in an idle state according to the embodiment.

FIG. 12 is a flowchart for describing batch cancellation processing on used blocks allocated to a logically free region of the SSD 413 by rewrite processing of dummy data to the logically free region, wherein the image forming apparatus 100 is in an idle state according to the embodiment. Here, parts common to FIG. 11 are given the same reference numerals, and explanation of this processing is omitted. A program for executing this processing may be loaded into the RAM-A 403 upon execution and executed under the control of the CPU-A 401.

In step S106, after the CPU-A 401 confirms the logically free region of the SSD 413, the processing proceeds to step S201, and the CPU-A 401 confirms whether the image forming apparatus 100 is in an idle state. In step S202, when the CPU-A 401 confirms that the image forming apparatus 100 is in an idle state, the processing proceeds to step S203. In step S203, the CPU-A 401 initiates batch processing for the successively writing the dummy data to the whole area of the logically free region of the SSD 413, and successively logically deleting the written dummy data.

Next, the processing proceeds to step S204, and the CPU-A 401 monitors conditions of external job entry to the image forming apparatus 100 during the rewrite processing of the dummy data, and in cases where job entry is confirmed, the processing proceeds to step S205. In step S205, the CPU-A 401 interrupts the dummy data rewrite processing. Next the processing proceeds to step S206, and the CPU-A 401 performs processing of the received job, and when the job processing ends, the processing proceeds to step S207 and the CPU-A 401 resumes the dummy data rewrite processing. Then, in step S208, the CPU-A 401 executes the dummy data rewrite processing until there is no unprocessed logically free region, and when there is no unprocessed logically free region, the processing ends.

By this processing, when the image forming apparatus 100 is in an idle state, batch processing of the writing of the dummy data to the whole area of the logically free region of the SSD 413 and of logical deletion of the written dummy data is performed. By this, there is the effect that free blocks in the logically free region can be generated more efficiently and quickly.

Figure 13:
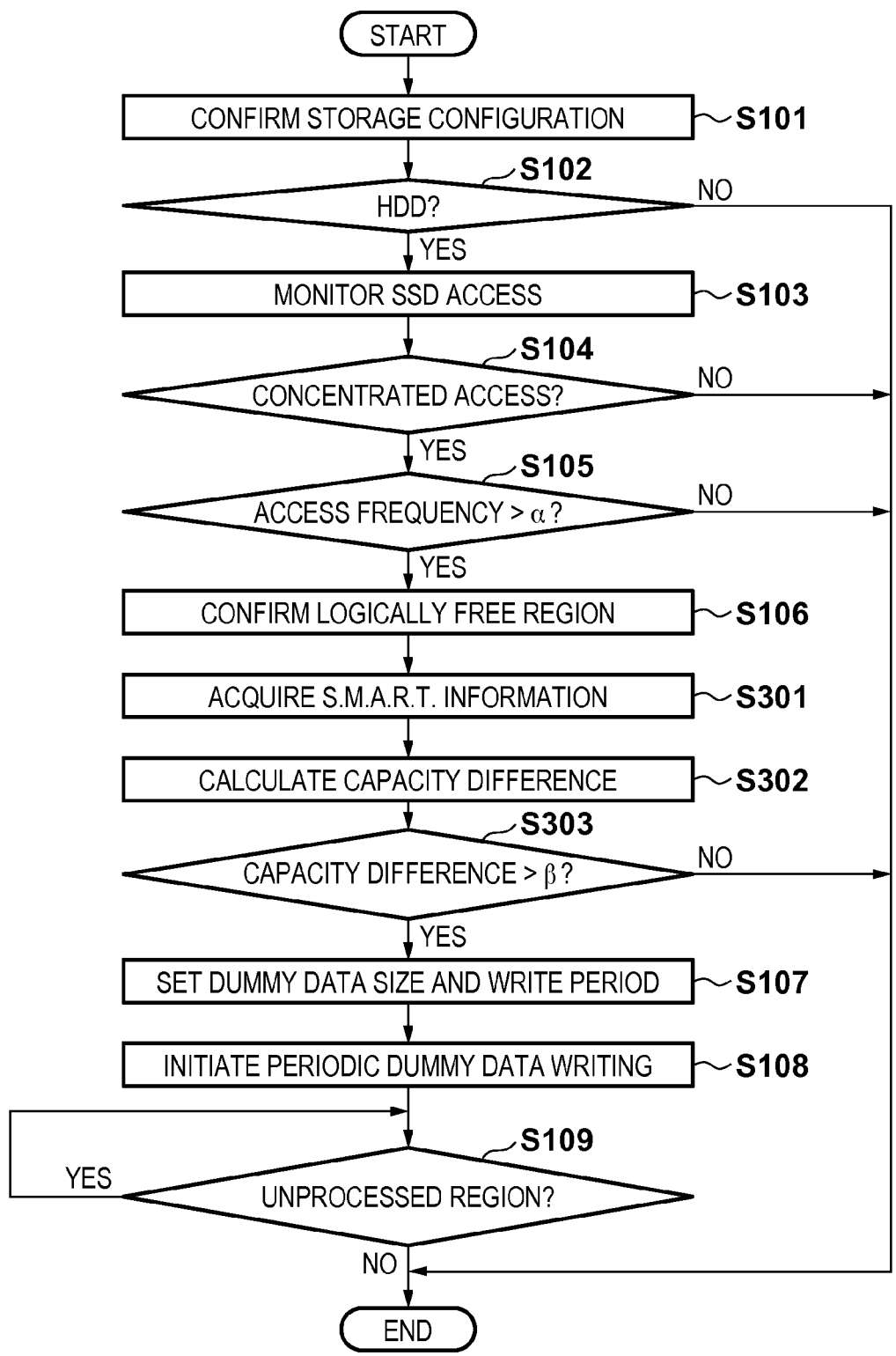
FIG. 13 is a flowchart for describing processing that adds determination processing for determining enactment of dummy data rewrite processing based on S.M.A.R.T. information to the processing shown in FIG. 11.

FIG. 13 is a flowchart for processing that adds determination processing for determining enactment of dummy data rewrite processing based on S.M.A.R.T. (Self-Monitoring, Analysis and Reporting Technology) information to the processing shown in FIG. 11. Here, parts common to FIG. 11 are given the same reference numerals, and explanation of this processing is omitted. A program for executing this processing may be loaded into the RAM-A 403 upon execution and executed under the control of the CPU-A 401. Note, the S.M.A.R.T. information is a function installed in the SSD 413 with the objectives of early detection of a malfunction/prediction of breakdown of the SSD 413.

After the CPU-A 401 confirms the logically free region of the SSD 413 in step S106, the processing proceeds to step S301, and the CPU-A 401 acquires the S.M.A.R.T. information of the SSD 413. Next, from the S.M.A.R.T. information the number of unused physical blocks of the flash memory installed in the SSD 413 is extracted. Next, the processing proceeds to step S302, and the CPU-A 401 calculates a capacity difference from the capacity of the logically free region of the SSD 413 confirmed in step S106 and the total capacity of the number of unused physical blocks extracted from the S.M.A.R.T. information. Next, the processing proceeds to step S303, and the CPU-A 401 compares the capacity difference calculated in step S302 and a predetermined value β, and in a case where the capacity difference exceeds the predetermined value β, the processing proceeds to step S107. In this way, in step S107 through step S109, the CPU-A 401 determines the period and the data size at which to write the dummy data to the logically free region of the SSD 413, and executes the periodic writing of the dummy data to the SSD 413 and the logical deletion processing on the written dummy data.

Thus, when it is determined that the number of unused physical blocks has become less than a predetermined value with respect to the capacity of the logically free region of the SSD 413 based on the S.M.A.R.T. information, writing of the dummy data to the whole area of the logically free region, and its logical deletion, is performed. By this, there is the effect that free blocks in the logically free region can be generated more efficiently.

Figure 14:
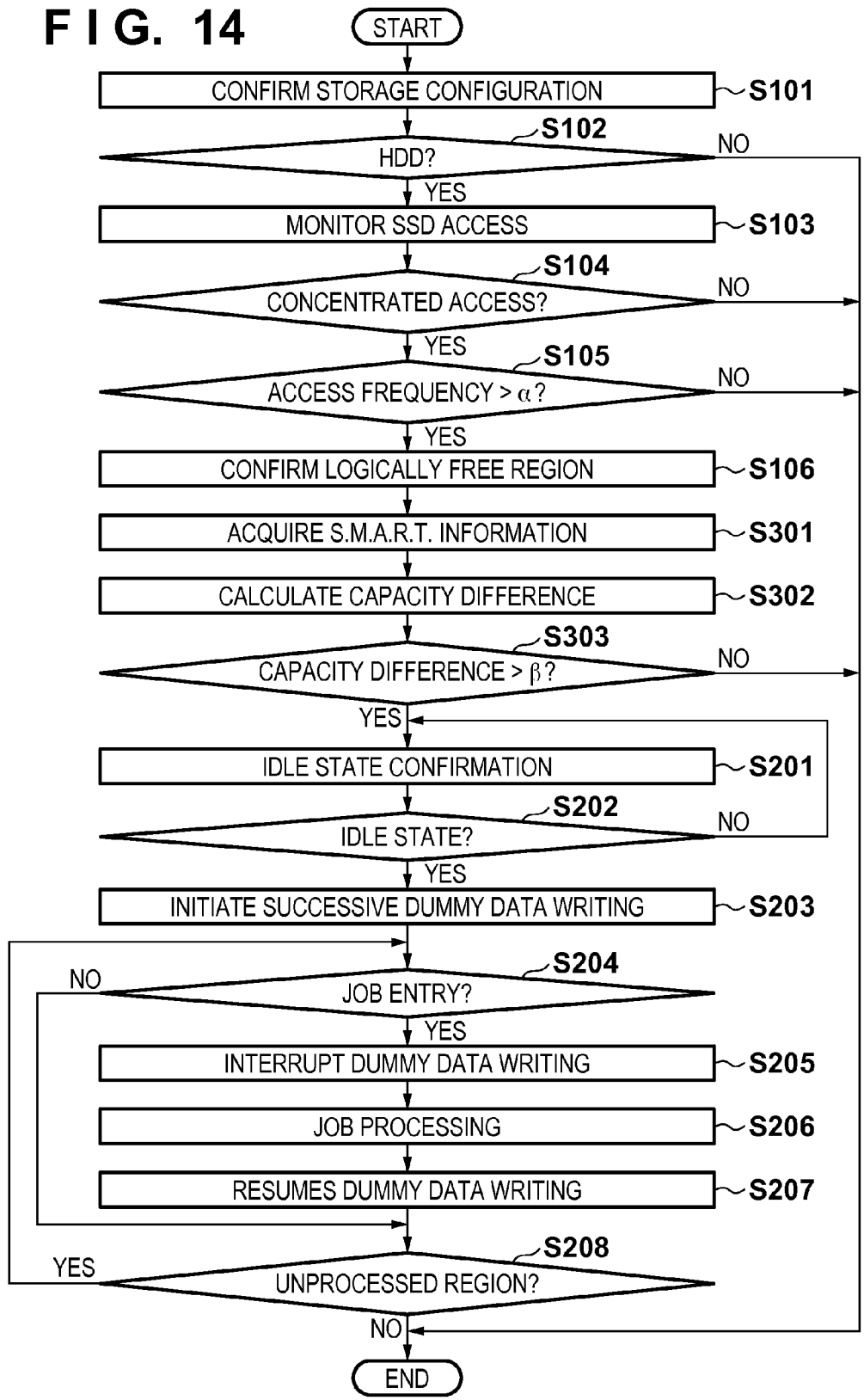
FIG. 14 is a flowchart for describing processing that adds determination processing for determining enactment of dummy data rewrite processing based on S.M.A.R.T. information to the processing shown in FIG. 12.

FIG. 14 is a flowchart for processing that adds determination processing for determining enactment of dummy data rewrite processing based on S.M.A.R.T. information to the processing shown in FIG. 12. Here, parts common to FIG. 11-FIG. 13 are given the same reference numerals, and explanation of this processing is omitted. A program for executing this processing may be loaded into the RAM-A 403 upon execution and executed under the control of the CPU-A 401.

In this processing, when it is determined that the number of unused physical blocks has become less than a predetermined value with respect to the capacity of the logically free region of the SSD 413 based on the S.M.A.R.T. information, the writing of the dummy data to the whole area of the logically free region, and its logical deletion is performed. Here, when the image forming apparatus 100 is in an idle state, batch performance of the writing of the dummy data to the whole area of the logically free region of the SSD 413 and the logical deletion of the written dummy data is performed.

By this, there is the effect that free blocks in the logically free region can be generated more efficiently and quickly.

Note, the previously described FIG. 11-FIG. 14 have been explained for an example of a case in which the image forming apparatus 100 has a storage configuration including both the SSD 413 and the HDD 407. However, the present embodiment is adaptable to a case in which there is no HDD 407. Below, explanation will be given for an embodiment in an environment where there is no HDD 407.

Figure 15:
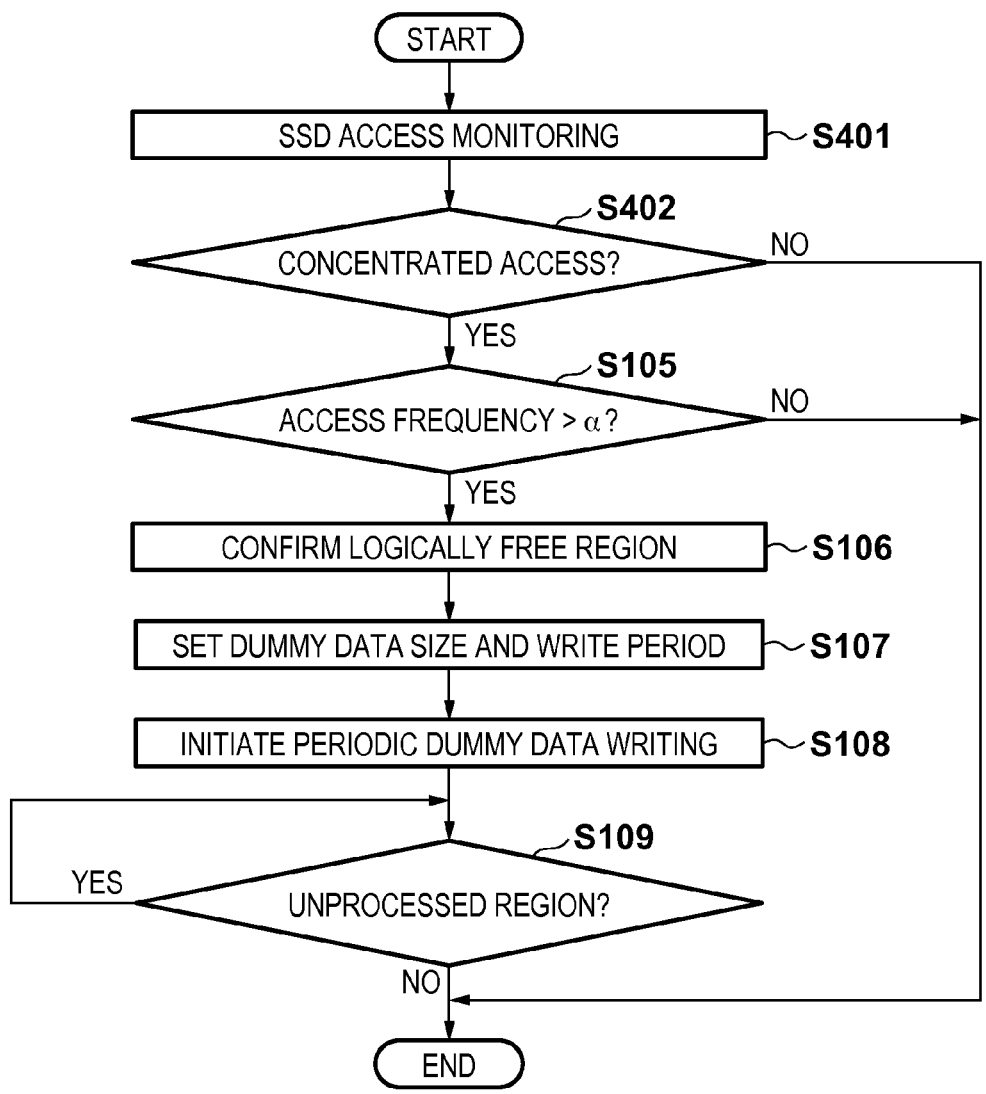
FIG. 15 is a flowchart for describing cancellation processing on a used block allocated to a logically free region by periodic rewrite processing of dummy data to a logically free region of the SSD in an environment where the image forming apparatus has no HDD.

FIG. 15 is a flowchart for describing cancellation processing on a used block allocated to a logically free region by periodic rewrite processing of dummy data to a logically free region of the SSD 413 in an environment where the image forming apparatus 100 has no HDD 407. Here, as is clear from a comparison with FIG. 11, step S101 and step S102 of FIG. 11 are omitted. Here, parts common to FIG. 11 are given the same reference numerals, and explanation of this processing is omitted. A program for executing this processing may be loaded into the RAM-A 403 upon execution and executed under the control of the CPU-A 401.

Firstly, in step S401, the CPU-A 401 monitors whether there is concentrated access by the OS on a particular logical address region of the SSD 413 using the access monitoring unit 414. Here, the access monitoring unit 414 monitors conditions of access to the SSD 413, and determines whether or not there is concentrated access to a particular address of the SSD 413, and the frequency of the access as well as the data size is stored in the RAM-A 403 or the HDD 407. In step S402, when the CPU-A 401 determines that there is concentrated access, the processing proceeds to step S105, and it determines that there is not concentrated access, the processing ends.

By this processing, in a case where the frequency of the access to the particular logical address region is higher than a predetermined amount, it is possible to write the dummy data to the logically free region, and to generate free blocks in the logically free region. Also, by determining a period for writing the dummy data to the logically free region of the SSD 413 and a data size based on the frequency of the concentrated access, and based on the data size of the access, it is possible to generate free blocks more effectively.

Figure 16:
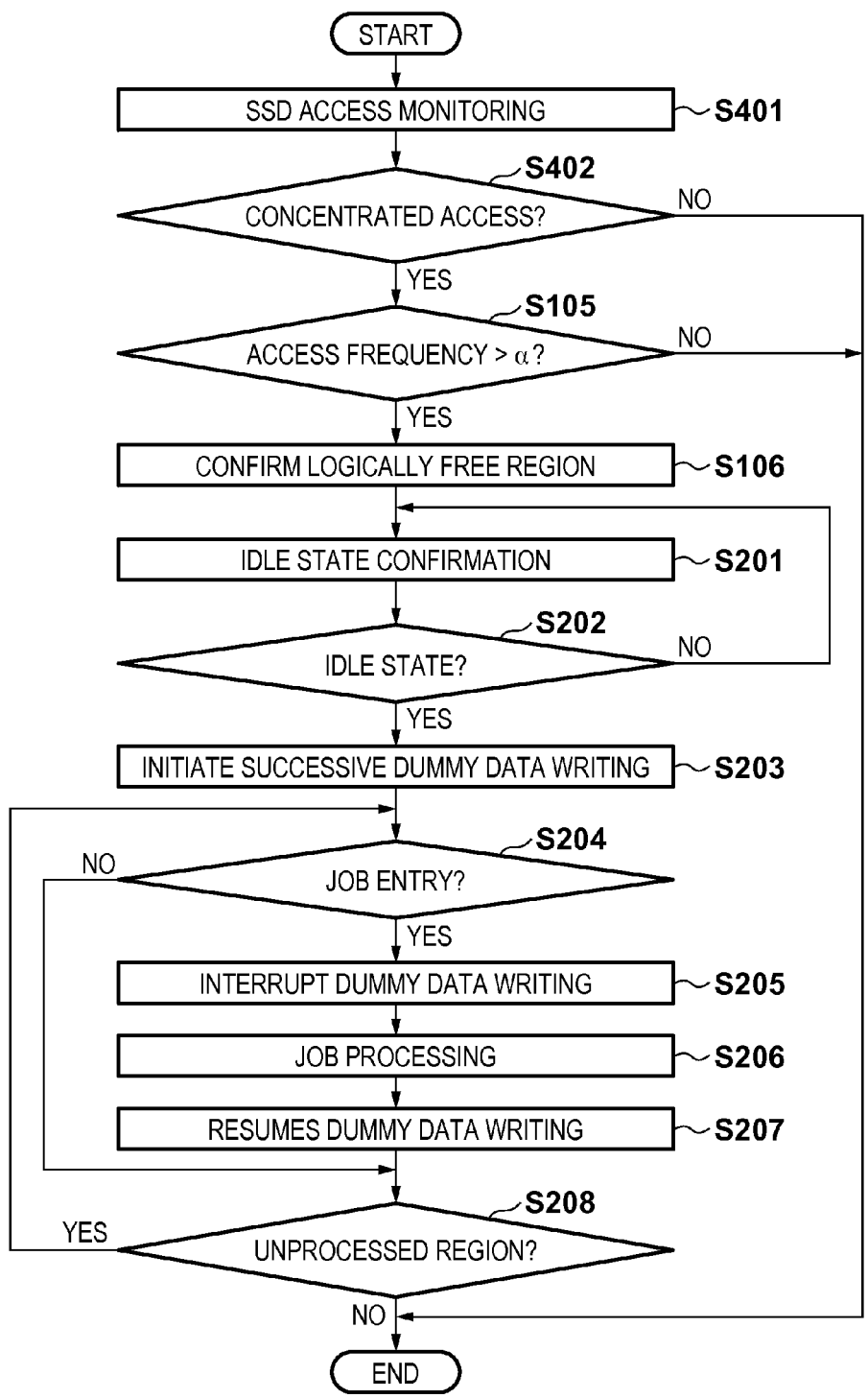
FIG. 16 is a flowchart for describing batch cancellation processing on a used block by rewrite processing of dummy data to a logically free region of the SSD, wherein the image forming apparatus is in an idle state in an environment where the image forming apparatus has no HDD.

FIG. 16 is a flowchart for describing batch cancellation processing on used blocks by rewrite processing of the dummy data to a logically free region of the SSD 413, where the image forming apparatus 100 is in an idle state in an environment where the image forming apparatus 100 has no HDD 407. Here, as is clear from a comparison with FIG. 12, step S101 and step S102 are omitted, and step S401 and step S402 of FIG. 15 are added. Here, parts common to FIG. 11, FIG. 12 and FIG. 15 are given the same reference numerals, and explanation of this processing is omitted. A program for executing this processing may be loaded into the RAM-A 403 upon execution and executed under the control of the CPU-A 401.

By this processing, when the image forming apparatus 100 is in an idle state, batch processing of the writing of the dummy data to the whole area of the logically free region of the SSD 413 and of logically deleting the written dummy data is performed. By this, there is the effect that free blocks in the logically free region can be generated more efficiently and quickly.

FIG. 17 is a flowchart for processing that adds determination processing for determining enactment of dummy data rewrite processing based on S.M.A.R.T. information, similarly to FIG. 13, in an idle state in an environment where the image forming apparatus 100 has no HDD 407. Here, as is clear from a comparison with FIG. 13, step S101 and step S102 are omitted, and step S401 and step S402 of FIG. 15 are added. Here, parts common to FIG. 11, FIG. 13 and FIG. 15 are given the same reference numerals, and explanation of this processing is omitted. A program for executing this processing may be loaded into the RAM-A 403 upon execution and executed under the control of the CPU-A 401.

Thus, when it is determined that the number of unused physical blocks has become less than a predetermined value with respect to the capacity of the logically free region of the SSD 413 based on the S.M.A.R.T. information, writing of the dummy data to the whole area of the logically free region, and its logical deletion is performed. By this, there is the effect that free blocks in the logically free region can be generated more efficiently.

Figure 18:
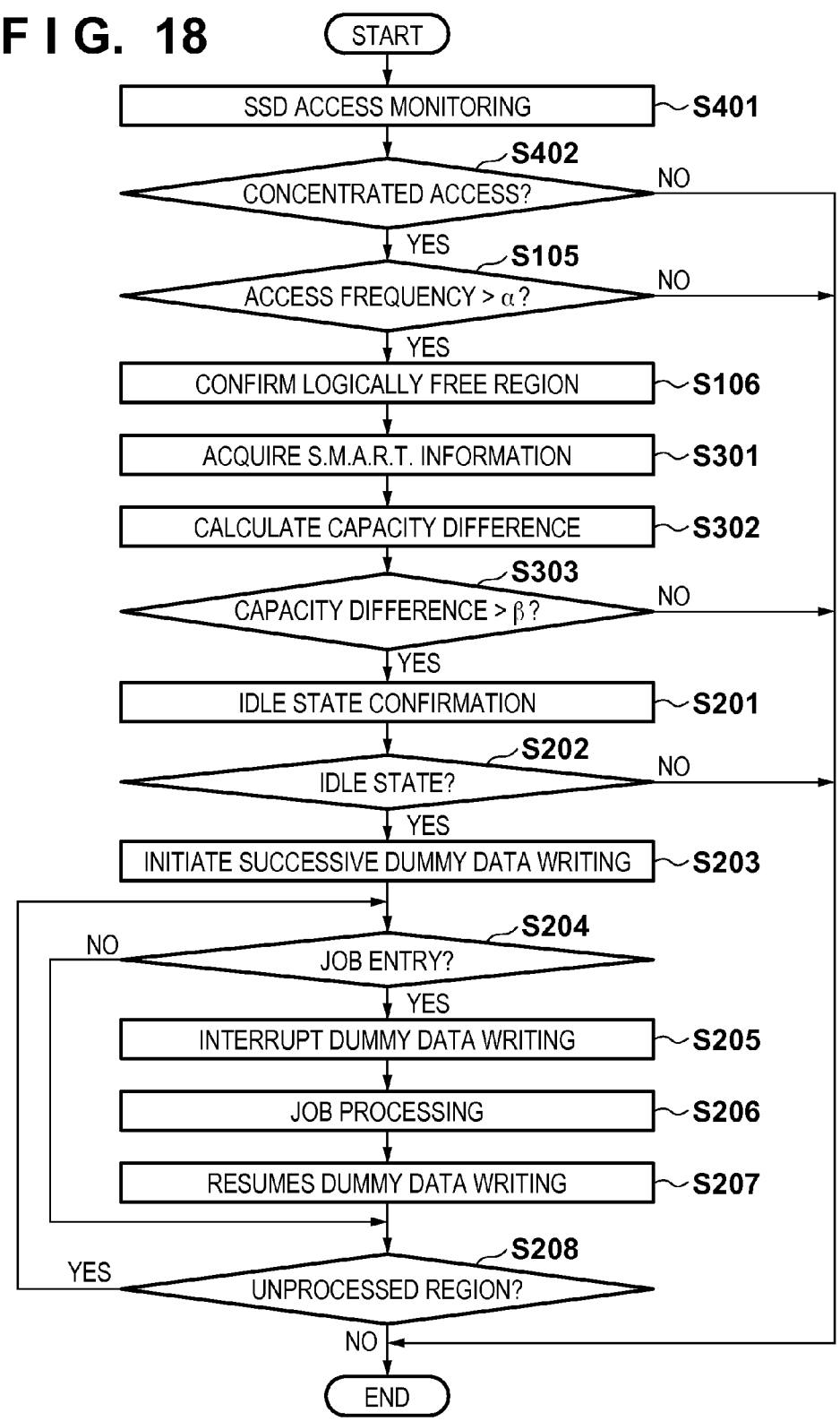
FIG. 18 is a flowchart for describing processing that adds determination processing for determining enactment of dummy data rewrite processing based on S.M.A.R.T. information to the processing of FIG. 12, similarly to FIG. 14, in an idle state in an environment wherein the image forming apparatus has no HDD.

FIG. 18 is a flowchart for processing that adds determination processing for determining enactment of dummy data rewrite processing based on S.M.A.R.T. information to the processing of FIG. 12, similarly to FIG. 14, in an idle state in an environment wherein the image forming apparatus 100 has no HDD 407. Here, as is clear from a comparison with FIG. 14, step S101 and step S102 are omitted, and step S401 and step S402 of FIG. 15 are added. Here, parts common to FIG. 11, FIG. 14 and FIG. 15 are given the same reference numerals, and explanation of this processing is omitted. A program for executing this processing may be loaded into the RAM-A 403 upon execution and executed under the control of the CPU-A 401.

In this processing, when it is determined that the number of unused physical blocks has become less than a predetermined value with respect to the capacity of the logically free region of the SSD 413 based on the S.M.A.R.T. information, the writing of the dummy data to the whole area of the logically free region, and its logical deletion is performed. Here, when the image forming apparatus 100 is in an idle state, batch performance of the writing of the dummy data to the whole area of the logically free region of the SSD 413 and the logical deletion of the written dummy data is performed. By this, there is the effect that free blocks in the logically free region can be generated more efficiently and quickly.

As explained above, by the present embodiment, dummy data rewrite processing is performed on a logically free region allocated to physical blocks of a flash memory in a used state of a semiconductor storage apparatus. By this, unused blocks are generated for the logically free region, and a rewrite frequency leveling function can be recovered.

Also, by periodically performing dummy data rewrite processing on the whole area of the logically free region for an appropriate data size, load due to this processing is dispersed. With this, it is possible to suppress performance degradation due to this processing.

Also, "FF" data where all bits are "1" is used as the dummy data. Because of this, it is possible to suppress expenditure of device life span substantially when bit data in the blocks to be written in the flash memory installed in the semiconductor storage apparatus does not include "0".

Also, by setting the data size of the dummy data written periodically to be an integer factor of the block size of the flash memory installed in the semiconductor storage apparatus, generation of unused blocks by the dummy data writing can be reliably performed.

Also, by writing updated data after having completely deleted data that has become unnecessary when rewriting data, it is possible to completely delete data within unused blocks.

Also, in a case where the amount of unused blocks of the storage apparatus from the S.M.A.R.T. information and the logically free capacity is compared, and the difference is less than a predetermined value (the amount of unused blocks become greater than a predetermined amount), the dummy data unused block generation processing is stopped. With this, there is an effect that unnecessary rewrite processing can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261630, filed Nov. 29, 2012, which is hereby incorporated by reference herein in its entirety.

What is claimed is:

1. An information processing apparatus, comprising:
   at least one non-transitory memory device;
   at least one processor;
   a determination unit configured to determine whether or not a frequency of access on a particular logical address region of a storage device configured to perform dynamic wear leveling is greater than or equal to a predetermined amount;
   a confirmation unit configured to confirm a logically free region of the storage device in a case where the determination unit determined that the frequency of access is greater than or equal to the predetermined amount; and
   a free block generation unit configured to perform writing of dummy data to the logically free region confirmed by the confirmation unit and a logical deletion of the logically free region to which the dummy data has been written,
   wherein the confirmation unit, the free block generation unit, and the determination unit are implemented at least in part by the at least one processor executing at least one program recorded on the at least one non-transitory memory device.

2. The information processing apparatus according to claim 1, wherein the free block generation unit is further configured to determine, based on the frequency of access and a data size of data that is accessed, a data size of dummy data to be written to the logically free region and a period at which the dummy data to be written to the logically free region is to be written.

3. The information processing apparatus according to claim 2, wherein the period at which the dummy data to be written to the logically free region is to be written is synchronized with a period of access to the logical address region.

4. The information processing apparatus according to claim 2, wherein the data size of the dummy data to be written to the logically free region is an integer factor of a block size of a flash memory that the storage device is equipped with.

5. The information processing apparatus according to claim 1, wherein the free block generation unit is further configured to, in a case where the information processing apparatus is in an idle state, successively perform the writing of the dummy data to the logically free region confirmed by the confirmation unit and the logical deletion of the region to which the dummy data is written.

6. The information processing apparatus according to claim 1, wherein
   the confirmation unit is further configured to acquire an amount of unused blocks of a flash memory that the storage device is equipped with included in Self-Monitoring, Analysis and Reporting Technology (S.M.A.R.T.) information of the storage device, and
   the free block generation unit is further configured to perform the writing of the dummy data to the logically free region confirmed by the confirmation unit and the logical deletion of the region to which the dummy data is written in accordance with a difference between the amount of unused blocks and a total capacity of the logically free region.

7. The information processing apparatus according to claim 1, wherein the dummy data is data for which all bits are 1.

8. The information processing apparatus according to claim 1, wherein the confirmation unit is configured to not confirm a logically free region of the storage device in a case where the determination unit determined that the frequency of access is less than the predetermined amount.

9. A method of controlling an information processing apparatus, the method comprising:

determining whether or not a frequency of access on a particular logical address region of a storage device configured to perform dynamic wear leveling is greater than or equal to a predetermined amount;

confirming a logically free region of the storage device in a case that it is determined that the frequency of access on the particular logical address region of the storage device is greater than or equal to the predetermined amount; and performing writing of dummy data to the logically free region confirmed in the confirming and a logical deletion of the logically free region to which the dummy data has been written.

10. A non-transitory computer-readable storage medium storing a program for causing a computer to execute a method of controlling an information processing apparatus, the method comprising:

determining whether or not a frequency of access on a particular logical address region of a storage device configured to perform dynamic wear leveling is greater than or equal to a predetermined amount;

confirming a logically free region of the storage device in a case that it is determined that the frequency of access on the particular logical address region of the storage device is greater than or equal to the predetermined amount; and performing writing of dummy data to the logically free region confirmed in the confirming and a logical deletion of the logically free region to which the dummy data has been written.

* * * * *